United States Patent
Iwane

(10) Patent No.: US 8,526,807 B2
(45) Date of Patent: Sep. 3, 2013

(54) FOCUS DETECTING APPARATUS

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/020,367

(22) Filed: Feb. 3, 2011

(65) Prior Publication Data

US 2011/0135292 A1 Jun. 9, 2011

Related U.S. Application Data

(63) Continuation of application No. PCT/JP2009/061019, filed on Jun. 17, 2009.

(30) Foreign Application Priority Data

Aug. 20, 2008 (JP) .................................. 2008-211645

(51) Int. Cl.
*G03B 7/099* (2006.01)

(52) U.S. Cl.
USPC .......................................... 396/113; 348/349

(58) Field of Classification Search
USPC .......................................... 396/113; 348/349
See application file for complete search history.

(56) References Cited

U.S. PATENT DOCUMENTS 4,246,476 A * 1/1981 Stauffer ..................... 250/201.2
4,560,863 A * 12/1985 Matsumura et al. ....... 250/201.2

FOREIGN PATENT DOCUMENTS

| JP | A-2007-11314 | 1/2007 |
|----|--------------|--------|
| JP | A-2007-65330 | 3/2007 |
| JP | A-2007-121896 | 5/2007 |
| JP | A-2008-116616 | 5/2008 |
| JP | A-2008-147821 | 6/2008 |

OTHER PUBLICATIONS

Translation of JP Publication No. 2008-116616; Title: Focus Detecting Device and Imaging Apparatus; Inventor: Utagawa, Takeshi; Publication Date: May 22, 2008.*
Translation of JP Publication No. 2007-065330; Title: Camera; Inventor: Nagano, Akihiko; Publication Date: Mar. 15, 2007.*
International Search Report for corresponding International Patent Application No. PCT/JP2009/061019, mailed on Jul. 28, 2009 (w/ English translation).
International Preliminary Report on Patentability for International Patent Application No. PCT/JP2009/061019, mailed on Mar. 8, 2011.

\* cited by examiner

*Primary Examiner* — Rodney Fuller
*Assistant Examiner* — Fang-Chi Chang
(74) *Attorney, Agent, or Firm* — Oliff & Berridge, PLC

(57) ABSTRACT

Disclosed in a focus detecting apparatus comprising: a micro lens array arranged with a plurality of micro lenses, a photo detector that has a plurality of detecting elements provided in correspondence with the micro lenses and receives light flux from an optical system via the micro lenses; and a focus detector that selects a pair of groups of detecting elements from the plurality of detecting elements based on an F-value of the optical system and a brightness of the light flux from the optical system and detects a focus adjustment status of the optical system based on a pair of light receiving signals obtained in the groups of detecting elements.

7 Claims, 15 Drawing Sheets

FIG. 5

$$A1 \quad \begin{pmatrix} -1 & 0 & 1 \\ -2 & 0 & 2 \\ -1 & 0 & 1 \end{pmatrix}$$

$$A2 \quad \begin{pmatrix} 0 & 1 & 2 \\ 0 & 0 & 0 \\ -2 & -1 & 0 \end{pmatrix}$$

$$A3 \quad \begin{pmatrix} 2 & 1 & 0 \\ 0 & 0 & 0 \\ 0 & -1 & -2 \end{pmatrix}$$

$$B1 \quad \begin{pmatrix} 0 & 0 & 0 \\ 1 & -2 & 1 \\ 0 & 0 & 0 \end{pmatrix}$$

$$B2 \quad \begin{pmatrix} 0 & 1 & 2 \\ 0 & -6 & 0 \\ 2 & 1 & 0 \end{pmatrix}$$

$$B3 \quad \begin{pmatrix} 2 & 1 & 0 \\ 0 & -6 & 0 \\ 0 & 1 & 2 \end{pmatrix}$$

$$C1 \quad \begin{pmatrix} 1 & 0 & -1 \\ 2 & 0 & -2 \\ 1 & 0 & -1 \end{pmatrix}$$

$$C2 \quad \begin{pmatrix} 0 & -1 & -2 \\ 0 & 0 & 0 \\ 2 & 1 & 0 \end{pmatrix}$$

$$C3 \quad \begin{pmatrix} -2 & -1 & 0 \\ 0 & 0 & 0 \\ 0 & 1 & 2 \end{pmatrix}$$

FOCUS DETECTING APPARATUS

This is a Continuation of International Patent Application No. PCT/JP2009/061019 filed Jun. 17, 2009, which claims priority to Japanese Patent Application No. 2008-211645 filed Aug. 20, 2008. The disclosures of the prior applications are hereby incorporated by reference herein in their entirety.

BACKGROUND OF THE INVENTION

Incorporation by Reference

The disclosure of the Japanese Patent Application No. 2008-211645 filed on Aug. 20, 2008 is herein incorporated by reference.

1. Field of the Invention

This invention relates to a focus detecting apparatus.

2. Related Background of the Invention

An apparatus is known in which micro lenses arranged two-dimensionally and a plurality of detecting elements (photoelectric conversion elements) for each micro lens are provided to generate a pair of signal sequences corresponding to respective images caused from light fluxes having passed through different pupil areas of an imaging optical system on the basis of received light outputs obtained from the plurality of detecting elements, and to detect a phase difference in this pair of signal sequences thereby detecting a focus adjustment status of the imaging optical system (Japanese Patent Application, Publication No. 2007-11314).

SUMMARY OF THE INVENTION

However, the prior art focus detecting apparatus has caused the following problem when being used for an imaging apparatus with an interchangeable shooting lens, such as a single-lens reflex digital camera. That is, the prior art focus detecting apparatus has been required to be designed corresponding to the minimum aperture value among conceivable aperture values in order to be compatible with a plurality of interchangeable lenses having different aperture values. As a consequence, the base line length, which is a space between a pair of groups of detecting elements to be used for focus detecting, has come to be small thereby to cause a problem that the accuracy in focus detecting is deteriorated.

Problems to be solved by the present invention include appropriately selecting a pair of groups of detecting elements to be used for focus detecting thereby providing a focus detecting apparatus and an imaging apparatus which are capable of improving the accuracy in focus detecting.

According to the first aspect of the present invention, there is configured a focus detecting apparatus comprising: a micro lens array arranged with a plurality of micro lenses; a photo detector that has a plurality of detecting elements provided in correspondence with the micro lenses and receives light flux from an optical system via the micro lenses; and a focus detector that selects a pair of groups of detecting elements from the plurality of detecting elements based on an F-value of the optical system and a brightness of the light flux from the optical system and detects a focus adjustment status of the optical system based on a pair of light receiving signals obtained in the groups of detecting elements.

According to the second aspect of the present invention, the focus detector may be configured to determine a space between the pair of groups of detecting elements depending on the F-value.

According to the third aspect of the present invention, the focus detecto may be configured to decrease, when the brightness of the light flux is higher, a number of the detecting elements included in the group of detecting elements compared with when the brightness of the light flux is lower.

According to the fourth aspect of the present invention, the focus detector may be configured to set a selecting number of the detecting elements in response to outputs of the detecting elements.

According to the fifth aspect of the present invention, the focus detector may be configured to select, as the groups of detecting elements, a plurality of detecting elements symmetrical about a position corresponding to a pupil center of the optical system, from the plurality of detecting elements.

According to the sixth aspect of the present invention, the focus detector may be configured to convert a relative shift amount in the pair of light receiving signals having been selected to a defocus amount of the optical system, and determines a conversion factor at a time of the converting depending on a space between the pair of groups of detecting elements.

According to the present invention, a pair of detecting elements or a pair of groups of detecting elements is appropriately selected to be used for focus detecting thereby allowing to improve the accuracy in focus detecting.

BRIEF DESCRIPTION OF DRAWINGS

FIG. 5 illustrates exemplary matrices for differentiation filters to be used for the focus detecting apparatus of the camera illustrated in FIG. 1;

DISCRIPTION OF THE PREFERRED EMBODIMENTS

While illustrative embodiments will be hereinafter described with reference to the accompanying drawings wherein the present invention is applied to a single-lens reflex digital camera having an interchangeable lens, the present invention is applicable to any imaging apparatus and non-retractable lens type camera which perform focus adjustment of a shooting lens.

Figure 1:
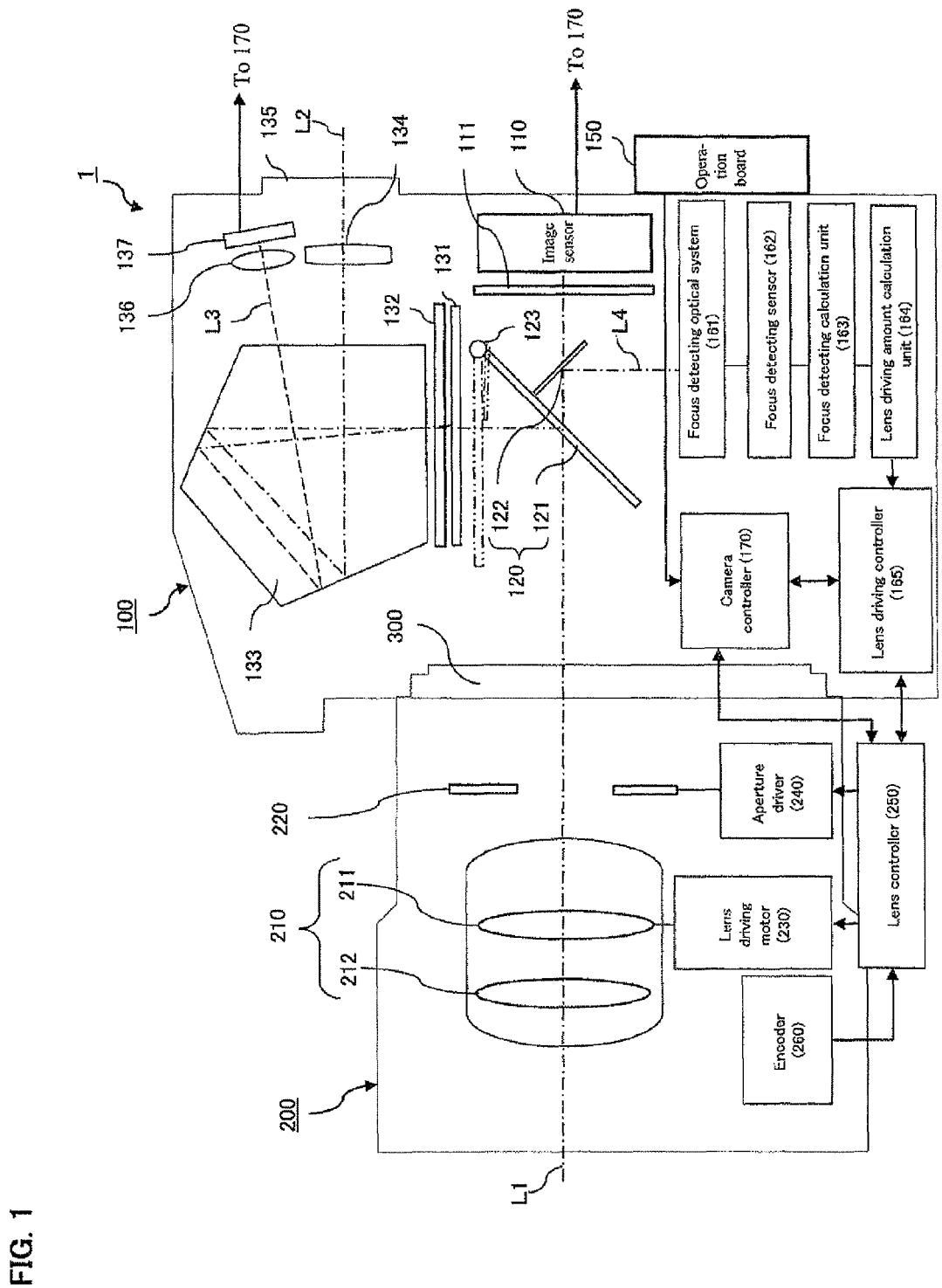
FIG. 1 is a block diagram illustrating a single-lens reflex digital camera in an embodiment according to the present invention.

FIG. 1 is a block diagram illustrating a configuration where an embodiment of the present invention is applied to a single-lens reflex digital camera 1 (hereinafter referred to as simply "camera 1").

The camera 1 according to the present embodiment is provided with a camera body 100 and a lens barrel 200. The camera body 100 and lens barrel 200 are detachably connected to each other by means of a mount 300. In the camera 1 according to the present embodiment, the lens barrel 200 is interchangeable depending on the purpose of shooting etc.

The lens barrel 200 is provided therein with a shooting optical system which comprises shooting lenses 210 including a focus lens 211 and a zoom lens 212, an aperture device 220, and other components thereof.

The focus lens 211 is provided movably along an optical axis L1 thereof, and the position of focus lens 211 is adjusted by a lens driving motor 230 while the position or the travel distance of focus lens 211 is detected by an encoder 260. The focus lens 211 is movable in the direction of the optical axis L1 by the rotation of a rotating barrel from one end position facing the camera body (near end) to the other end position facing a subject (far end). Note that information regarding the position or the travel distance of focus lens 211 detected by the encoder 260 is transmitted via a lens controller 250 to a lens driving controller 165. Also note that the lens driving motor 230 is driven by a driving signal, which is received from the lens driving controller 165 via the lens controller 250, in accordance with a driving distance and a driving speed calculated based on a focus detecting result as will be described later.

The aperture device 220 is configured such that the diameter of an aperture centering the optical axis L1 is adjustable in order to limit an amount of light flux that reaches an image sensor 110 through the shooting lenses 210. Adjustment of the aperture diameter by the aperture device 220 may be performed through obtaining a signal relevant to an aperture value calculated in an automatic exposure mode, for example, and transmitting the obtained signal from a camera controller 170 to an aperture driver 240 via the lens controller 250. Alternatively, adjustment of the aperture diameter may also be accomplished through setting an aperture value by manual operation at an operation board 150 provided on the camera body 100, and transmitting a signal relevant to the set aperture value from the camera controller 170 to the aperture driver 240 via the lens controller 250. The aperture diameter of aperture device 220 is detected by an aperture diameter detector not shown, and the current aperture diameter is recognized by the lens controller 250.

The lens controller 250 is provided in the lens barrel 200. The lens controller 250, which is configured with a microprocessor and peripheral components such as memories, is electrically connected with the camera controller 170 to receive information regarding a defocus amount, an aperture controlling signal and the like from the camera controller 170 and transmit lens information such as aperture value (F value) to the camera controller 170.

In turn, the camera body 100 is provided with a mirror system 120 for guiding the light flux from a subject to the image sensor 110, a view finder 135, a photometric sensor 137 and a focus detecting optical system 161. This mirror system 120 comprises a quick return mirror 121 adapted to pivotally move around a pivot axis 123 within a predetermined angular range between an observing position to a subject and a shooting position to the subject, and a sub mirror 122 pivotally provided at the quick return mirror 121 and adapted to move pivotally in synchronization with the quick return mirror 121.

FIG. 1 illustrates two statuses of the mirror system 120, one for the observing position to a subject indicated by solid line and the other for the shooting position to the subject indicated by dashed two dotted line. The mirror system 120 moves pivotally between the two statuses, that is, in the observing position to the subject, the mirror system 120 is positioned on the optical path of optical axis L1, while in the shooting position to the subject, the mirror system 120 escapes from the optical path of optical axis L1.

The quick return mirror 121 is configured as a half mirror. In the status of the observation position to a subject, the quick return mirror 121 reflects certain light fluxes (optical axes L2 and L3) extracted from the light flux from the subject (optical axis L1) to guide respectively toward the view finder 135 and the photometric sensor 137, and transmits the residual light flux (optical axis L4) to guide toward the sub mirror 122. In contrast, the sub mirror 122 is configured as a total reflection mirror, and guides the residual light flux (optical axis L4) transmitted through the quick return mirror 121 toward the focus detecting optical system 161.

Accordingly, when the mirror system 120 is positioned at the observing position, the light flux from a subject (optical axis L1) is guided to the view finder 135, the photometric sensor 137 and the focus detecting optical system 161, thereby allowing a photographer to observe the subject, and a calculation for exposure and a detection for a focus adjustment status of the focus lens 211 may be performed. Thereafter, if the photographer fully presses a release button, then the mirror system 120 moves pivotally to the shooting position thereby to guide the light flux (optical axis L1) from the subject toward the image sensor 110, and the image data having been shot is stored into a memory not shown.

The image sensor 110 is provided in the camera body 100 so as to be located on the optical axis L1 of the light flux from a subject and at a position to be a possible focusing plane, and a shutter 111 is provided to face the front surface of the image sensor 110. The image sensor 110 comprises a plurality of photoelectric conversion elements arranged two-dimensionally, and may be configured as a two-dimensional CCD image sensor, a MOS sensor, a CID, or the like.

When a shutter button included in the operation board 150 is fully pressed (i.e. at the time of shutter release), the shutter 111 provided to face the front surface of the image sensor 110 is released based on an exposure calculation result or only during the time period corresponding to the shutter speed set by a photographer thereby to expose the image sensor 110. The image sensor 110 photo-electrically converts the incident optical image into an electrical image signal, and the electrical image signal is stored into a memory not shown after being image processed in the camera controller 170. It is to be noted that the memory for storing the electrical image signal may be configured as a built-in memory, a card-type memory, or the like.

On the other hand, the light flux from the subject reflected by the quick return mirror 121 forms an image on a focal plane plate 131 arranged at a plane optically equivalent to the image sensor 110, and is then guided into an ocular globe of the photographer via a pentagonal prism 133 and an ocular lens 134. At this time, a transmissive-type liquid crystal display device 132 superimposes an indication such as a focus detecting area mark onto the image of a subject on the focal plane plate 131, and displays relevant information for shooting, such as a shutter speed, an aperture value, and the number of shootings, on an outer area not overlapping the image of the subject. This allows the photographer to observe both the subject and the back-ground thereof, and the relevant information for the shooting and the like, through the view finder 135 in a shooting standby status.

The photometric sensor 137, which is configured as a two-dimensional color CCD image sensor or the like, divides the shooting image into a plurality of areas to output a photometric signal in response to the luminance of each divided area. Image information obtained in the photometric sensor 137 is output to the camera controller 170 thereby to be utilized for an automatic exposure control.

The operation board 150, which includes the shutter release button and input switches for the photographer to set various operating modes, allows a photographer to select from AUTO FOCUS MODE/MANUAL MODE, or select from ONE SHOT MODE/CONTINUOUS MODE selectable especially in the AUTO FOCUS MODE. The shutter release button causes the shutter to be switched ON when being fully pressed. Other than this, when the shutter release button is half-pressed in the AUTO FOCUS MODE, the focusing operation of the focus lens is switched ON, whereas pulling away from the shutter release button turns OFF the focusing operation. Information relevant to various modes set by means of the operation board 150 is sent to the camera controller 170, and the camera controller 170 controls generally the operation of the camera 1.

The camera body 100 is provided therein with the camera controller 170. The camera controller 170, which is configured with a microprocessor and peripheral components such as memories, is electrically connected with the lens controller 250 via an electric signal connector provided on the mount 300, receives lens information from the lens controller 250, and sends information including the defocus amount, the aperture controlling signal and the like to the lens controller 250. In addition, the camera controller 170 reads out image information from the image sensor 110 as described above, and after a certain information processing if required, the image information is output to a memory not shown. Furthermore, the camera controller 170 corrects the shooting image information and detects a status of focus adjustment of the lens barrel 200, a status of aperture adjustment and the like, thereby ruling general control of the camera 1.

The focus detecting optical system 161, a focus detecting sensor 162, a focus detecting calculation unit 163 and a lens driving amount calculation unit 164 shown in FIG. 1 constitute the focus detecting apparatus of phase difference detecting type, which detects a defocus amount representing the focus adjustment status of the shooting lenses 210.

The focus detecting apparatus according to the present embodiment will be described with reference to FIGS. 2 to 4B.

Figure 2:
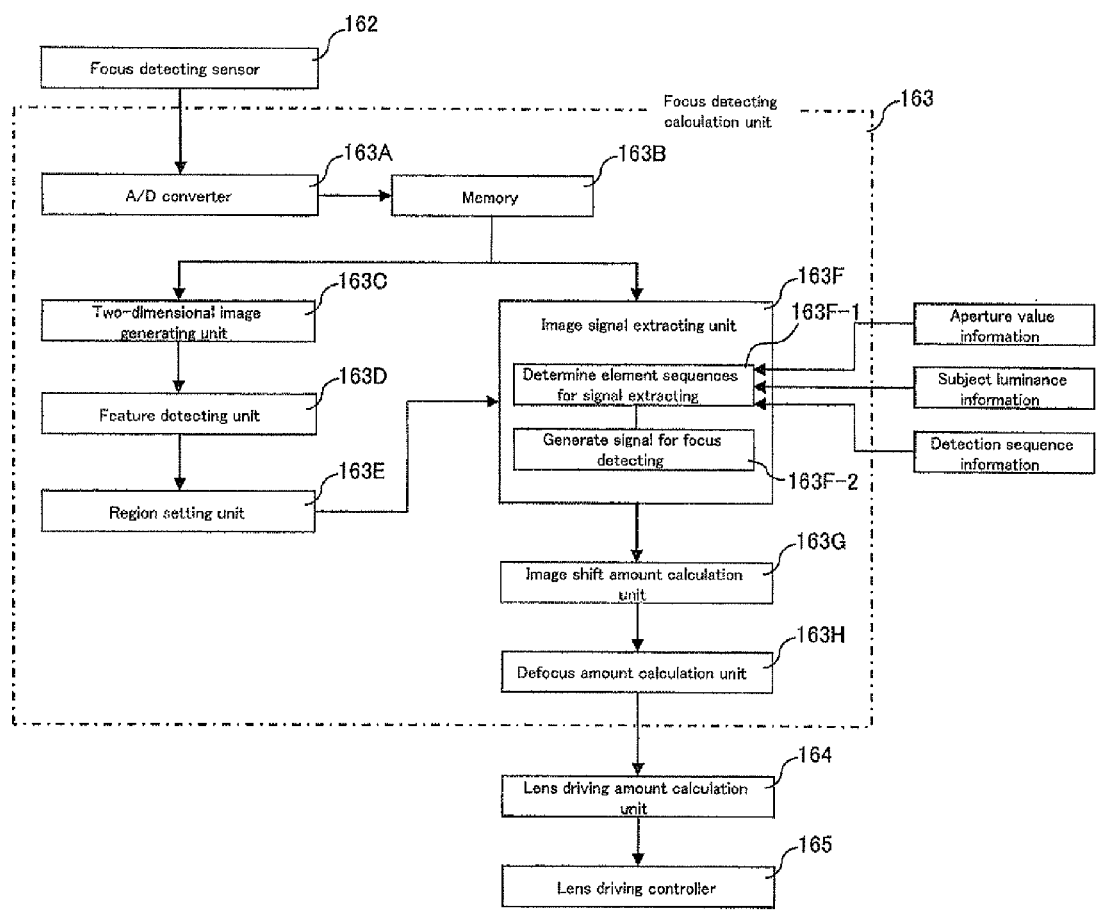
FIG. 2 is a block diagram illustrating the configuration of a focus detecting apparatus of the camera illustrated in FIG. 1.
Figure 3A:
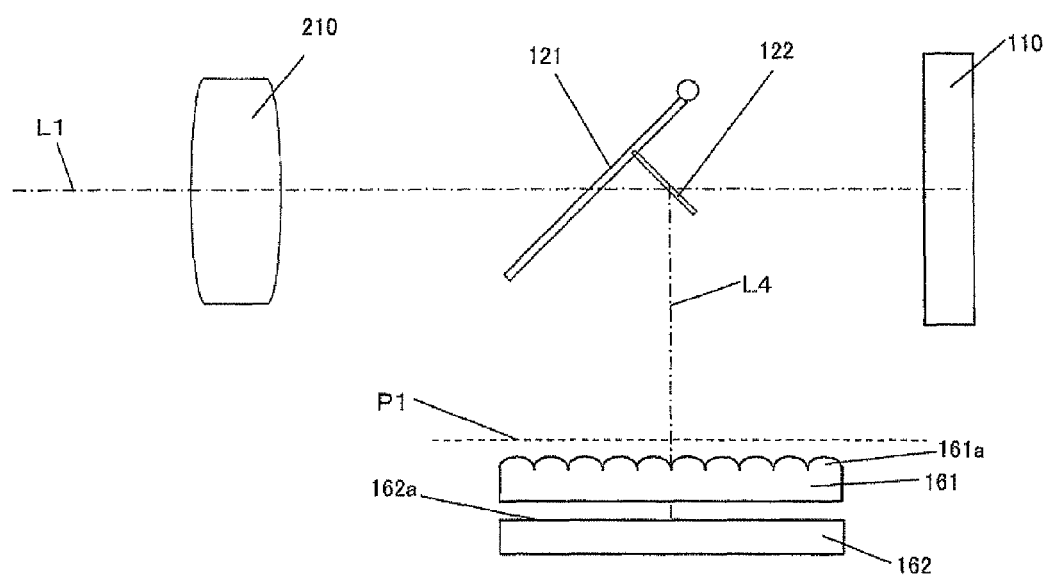
FIG. 3A is a view illustrating an optical arrangement in the focus detecting apparatus of the camera illustrated in FIG. 1.

FIG. 2 is a block diagram illustrating the configuration of the focus detecting apparatus, wherein the configuration of the focus detecting calculation unit 163 illustrated in FIG. 1 is depicted in detail according to a processing procedure thereof. FIG. 3A illustrates in turn an optical arrangement of the focus detecting apparatus, FIG. 3B is a cross-sectional view illustrating the focus detecting optical system 161 and the focus detecting sensor 162, FIG. 4A is a plan view illustrating an arrangement status of the focus detecting optical system 161 and the focus detecting sensor 162, and FIG. 4B is an enlarged plan view illustrating one element of the focus detecting optical system 161 and the focus detecting sensor 162.

Figure 4A:
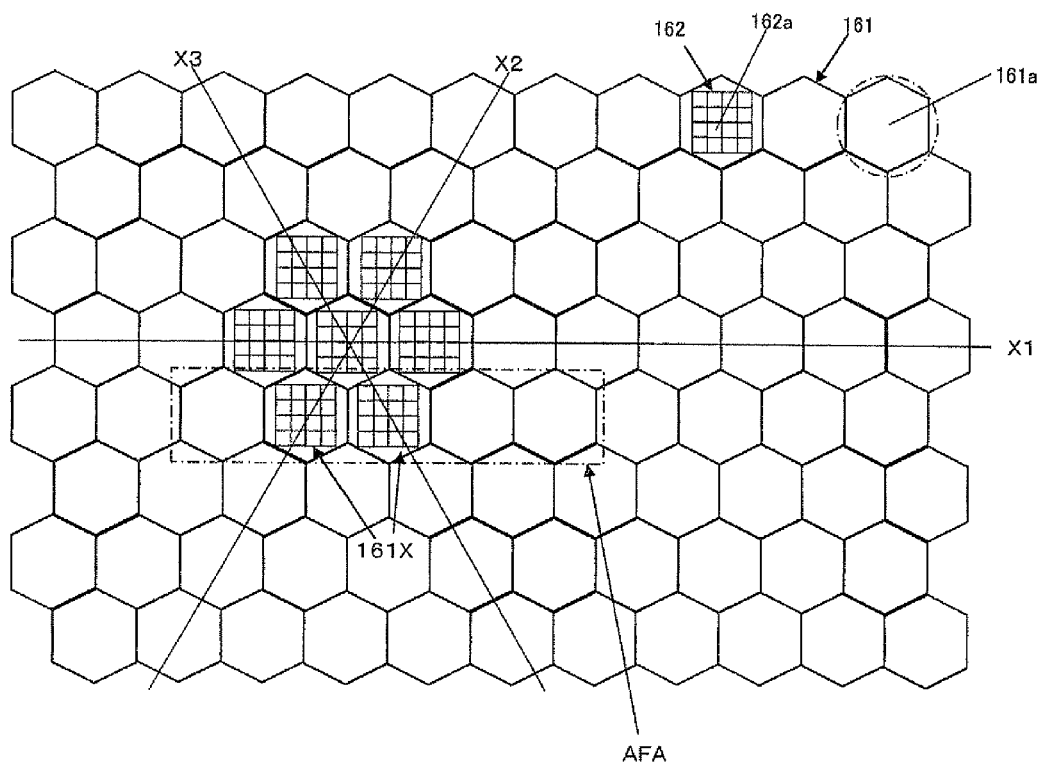
FIG. 4A is a plan view illustrating an arrangement status of the focus detecting optical system and the focus detecting sensor of the camera illustrated in FIG. 1.

The focus detecting optical system 161 is, as illustrated in FIG. 4A, provided as a micro lens array adapted to have a plurality of micro lenses 161*a* arranged densely in a two-dimensional plane (in a honeycomb structure), and is allocated adjacent to a position P1 to be a possible focusing plane of the shooting lenses 210, as illustrated in FIG. 3A. Hereinafter, the focus detecting optical system 161 is also referred to as the micro lens array 161. While the micro lens array 161 may be positioned just on the position P1 to be the possible focusing plane, the micro lens array 161 may be positioned alternatively on a point shifted away from the point P1 to be the possible focusing plane. Positioning just on the position P1 may causes a dead zone where the contrast in an image of a subject exists between micro lenses 161*a*, whereas shifted positioning from the position P1 may avoid the appearance of such dead zones.

Figure 3B:
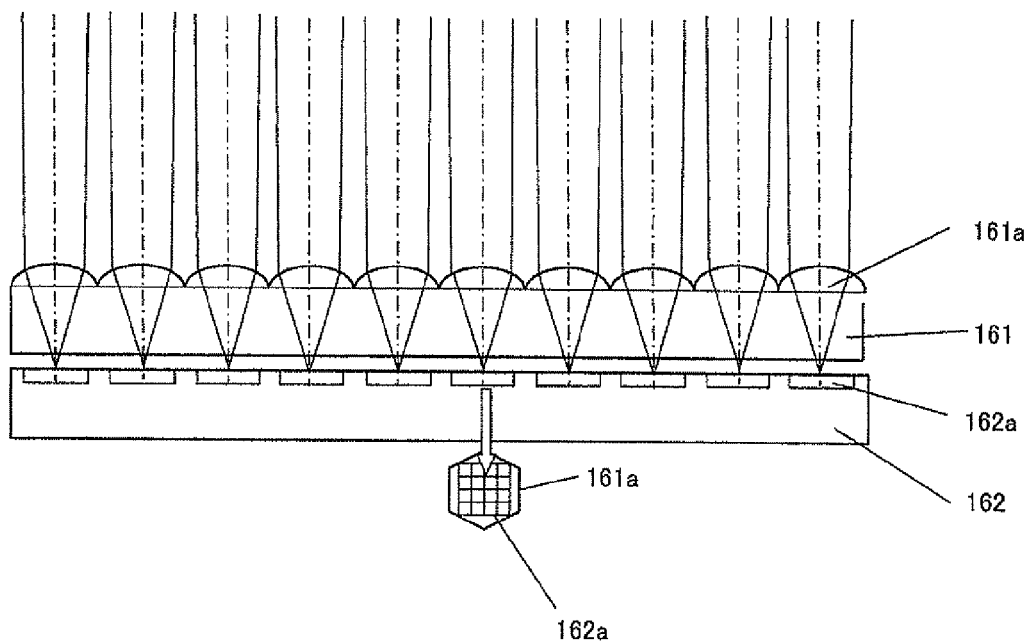
FIG. 3B is a cross-sectional view of a focus detecting optical system and a focus detecting sensor of the camera illustrated in FIG. 1.
Figure 4B:
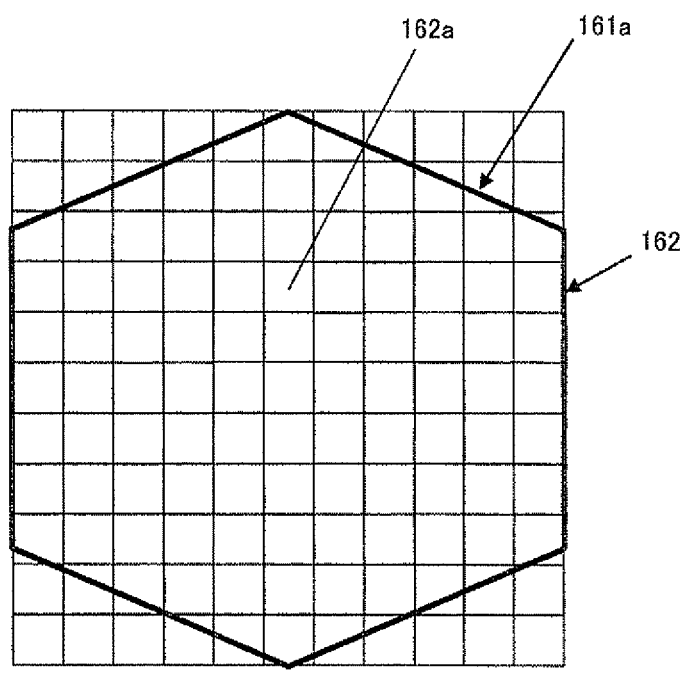
FIG. 4B is an enlarged plan view illustrating one element of the focus detecting optical system and the focus detecting sensor of the camera illustrated in FIG. 1.

The focus detecting sensor 162 is, as illustrated in FIG. 4A, provided as a photo-detector array adapted to have a plurality of photoelectric conversion elements 162*a* arranged densely in a two-dimensional plane, and is allocated approximately on focal points of the micro lenses 161*a* constituting the micro lens array 161, as illustrated in FIG. 3B. Hereinafter, the focus detecting sensor 162 is also referred to as the photo-detector array 162. It is to be noted that FIG. 3B illustrates beam focusing of each light flux to be received by the photoelectric conversion element 162*a* corresponding to the center of each micro lens 161*a* or the area adjacent to the center.

FIG. 4A is a plan view illustrating of the micro lens array 161 and the photo-detector array 162 seen from the sub mirror 122 to the micro lens array 161. The photoelectric conversion elements 162*a* are illustrated in the same figure behind only some of the micro lenses 161*a*, it is to be understood, however, that the photoelectric conversion elements 162*a* are arranged in the similar manner behind other micro lenses 161*a*.

Each micro lens 161*a* according to the present embodiment is formed as being cut out from a circular formed micro lens with a lens surface indicated by dashed dotted line into a regular hexagon, and has similar functional capability with the circular formed micro lens. Thus, the micro lens array 161 is formed as being arranged with such regular hexagonal micro lenses 161*a* in a honeycomb structure. Arranging regular hexagonal micro lenses 161*a* in a honeycomb structure in such a manner enables to avoid dead zones of focus detecting which may occur in the case of arranging circular formed micro lenses. Directions of up-and-down and left-and-right indicated in the same figure are similar to those in an image picked up by the image sensor 110.

In contrast, the photo-detector array 162 provided behind the micro lens array 161 is adapted such that square shaped photoelectric conversion elements 162*a* are arranged squarely. Each of the photoelectric conversion elements 162*a* is formed smaller than each micro lens 161*a*, and therefore, as enlarged and illustrated in FIG. 4B, a plurality of photoelectric conversion elements 162*a* are included in an area to which one micro lens 161*a* is projected perpendicularly. Thus, these photoelectric conversion elements 162*a* are photoelectric conversion elements 162*a* provided in correspondence with each micro lens 161*a*. Note that the number and the arrangement of photoelectric conversion elements 162a are not limited to those illustrated in FIG. 4B, and may be arbitrarily modified.

Incidentally, because the micro lens array 161 is positioned just on or in the vicinity of the position P1 (a plane being optically equivalent to an imaging plane of the image sensor 110) to be the possible focusing plane of the shooting lenses 210, an optical image is projected onto the micro lens array 161 similarly onto the image sensor 110. There is obtained a pupil image of the shooting lenses 210 focused onto the photo-detector array 162 by each micro lens 161a. Each photoelectric conversion element 162a of the photo-detector array 162 corresponds to each part of the pupil. Therefore, by selecting appropriate photoelectric conversion elements 162a of photo-detector array 162 for each micro lens 161a to receive light from that micro lens 161a and combining signals therefrom, it is enabled to obtain an image picked up at a certain aperture determined by the selected photoelectric conversion elements 162a.

In the present embodiment, focus detecting is performed according to the procedure described hereinafter.

The focus detecting calculation unit 163 illustrated in FIG. 2 includes an A/D converter 163A which converts an analog image signal output from the focus detecting sensor (photo-detector array) 162 to a digital image signal to be output into a memory 163B. The memory 163B outputs the digital image signal in response to a demand from a two-dimensional image generating unit 163C and an image signal extracting unit 163F.

Figure 6:
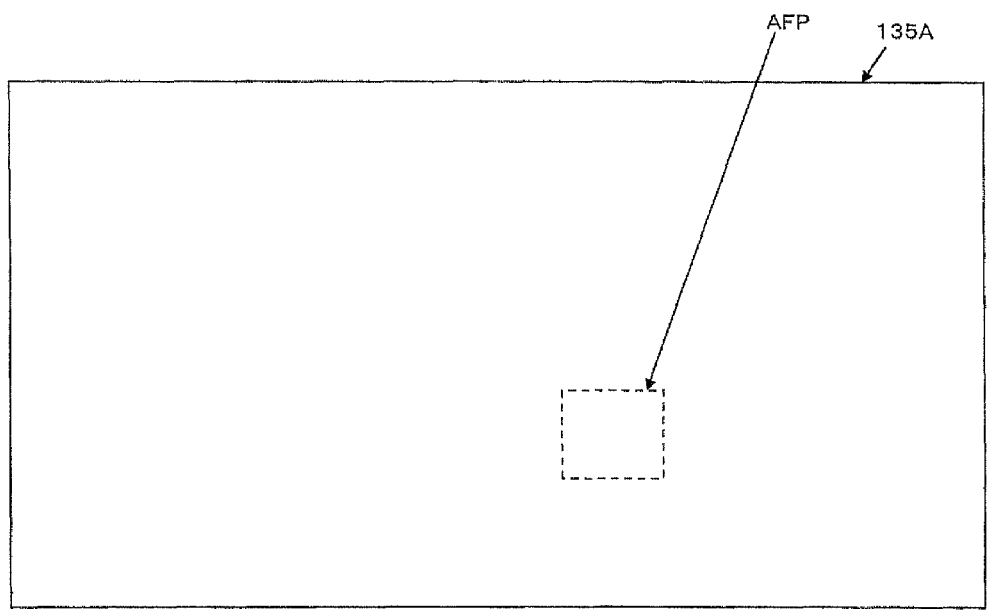
FIG. 6 is a view illustrating a shooting screen to be observed through a view finder of the camera illustrated in FIG. 1.

At this time, if a focus detecting area AFP depicted in FIG. 6 (depicted by dashed line in FIG. 6) is selected, then the outputs are read out only from the photoelectric conversion elements 162a which are covered by the micro lenses 161a within a specific area corresponding to the selected focus detecting area.

FIG. 6 illustrates a shooting screen 135A to be observed through the view finder 135, and it is assumed that the focus detecting area may be set at an arbitrary location within the shooting screen 135A in the present embodiment. The focus detecting area is, for example, set to correspond to a location which is selected as the location where a highest contrast is obtained in the image based on outputs from the photoelectric conversion elements 162a of the photo-detector array 162. In this case, if the focus detecting area AFP depicted by dashed line in FIG. 6 is selected, then the outputs are read out as signals for focus detecting from the photoelectric conversion elements 162a corresponding to the micro lenses 161a within the specific area centered on the focus detecting point AFP.

Note that the focus detecting area may comprise a plurality of areas preliminarily allocated within the shooting screen 135A. In this case, the liquid crystal display device 132 superimposes marks representing the locations of the plurality of focus detecting areas onto a subject image projected on the focal plane plate 131 thereby to provide an indication. In an operation, a photographer may select a desired focus detecting area AFP using the operation board 150, or an appropriate focus detecting area AFP is automatically selected based on the contrast of image in the similar manner as the above.

Referring again to FIG. 2, the two-dimensional image generating unit 163C determines the center of optical axis for each micro lens 161a, and generates a pan-focus image from data reflecting the output of focus detecting sensor 162 stored in the memory 163B and the determined center of optical axis for each micro lens. Thereafter, the two-dimensional image generating unit 163C receives from the camera controller 170 information relevant to the focus detecting area (AFP in FIG. 6, for example) selected as a focus detecting location, and extracts image data within the specific area centered on the focus detecting area from the generated pan-focus image to cut out a selective region.

Preceding the process for cutting out the selective region, it is required to calculate a pupil center position of the shooting lenses 210 in order to ensure the conjugate relationship with pupil as described above. The reason why of this is that the micro lens array 161 and the photo-detector array 162 are assembled in usual after being manufactured independently, and as such it is uncertain that which photoelectric conversion element 162a corresponds to which micro lens 161a and to which position on the corresponding micro lens 161a. Moreover, because it is expected that the lens barrel 200 may be interchanged for the single-lens reflex camera 1, the position of pupil of the shooting lenses 210 observed from each micro lens 161a possibly changes. Therefore, the position of the photoelectric conversion element 162a having a conjugate relationship with the center position of the pupil of shooting lenses 210 is determined as the center of micro lens 161a.

Thereafter, from the image data stored in the memory 16313, the image data of photoelectric conversion element(s) 162a corresponding to the obtained optical axis center of each micro lens 161a or corresponding to adjacent area around the center is extracted.

The two-dimensional image generated in the two-dimensional image generating unit 163C in such a manner is identical with an image shot with the aperture corresponding to the photoelectric conversion element 162a. Assuming for example that the size of photoelectric conversion element 162a is 3 μm, the focal distance of micro lens 161a is 200 μm, and the distance from the micro lens array 161 to the pupil is 70 mm, then the equivalent size of photoelectric conversion element 162a at the pupil is calculated as 1 mm, and a two-dimensional image is to be generated as being substantially equal to an image obtained through an aperture of 1 mmφ. For example, the focal distance of 50 min for the shooting lenses 210 gives the F-value of 50, thereby generating a pan-focus image with deep focal depth.

Now, the micro lens array 161 according to the present embodiment has, as illustrated in FIG. 4A, regular hexagonal micro lenses 161a arranged in a honeycomb structure, and therefore the sequence or the arrangement of image data comes to have a honeycomb structure. Consequently, at the time of generating a two-dimensional image, the image data may not be converted as it stands or directly to a pixel arrangement of square arrangement with equal intervals. That is, the positions of centers of respective micro lenses 161a in micro lens array 161 are arranged alternatively between even-numbered row and odd-numbered row, and if the pitch in vertical direction is one (arbitral unit), the pitch in horizontal direction is different as being $2/\sqrt{3}$ (arbitral unit). Given the foregoing, the two-dimensional image generating unit 163 according to the present embodiment rearranges the image data of such honeycomb arrangement into a square arrangement with equal intervals by performing an interpolation operation or an extrapolation operation.

A feature detecting unit 163D illustrated in FIG. 2 detects contrasts in a plurality of directions by convolving the pan-focus two-dimensional image generated in the two-dimensional image generating unit 163C, and selects a direction providing largest accumulated value in terms of the contrast ("convolving" means herein performing convolution as a binary operation, wherein one function f and other function g are added to each other while the function f being translated).

Directions allowing dense images to be extracted in the micro lens array 161 with honeycomb arrangement in the present embodiment are the three directions i.e. the horizontal direction X1 and directions X2 and X3 inclined respectively by ±60° (±π/3 rad) to the X1 direction, as shown in FIG. 4A. Therefore, contrasts are detected by convolving two-dimensional images in terms of these three directions X1 to X3. Note that any direction may be adopted for detecting contrasts other than these three directions X1 to X3.

Contrast detection for these three directions X1 to X3 may be performed by incorporating a differentiation filter into a convolution filter for two-dimensional image thereby to image edges of an image having contrast in each direction. FIG. 5 shows exemplary matrices for differentiation filters applicable to the present embodiment. (A1) to (A3) in FIG. 5 are matrices presenting Sobel filters (gradient filters) as first-order differentiation filters for two-dimensional images, which detect edge areas in contrasts in terms of the horizontal direction X1, π/3 direction X2, and 2π/3 direction X3, respectively. In contrast, (B1) to (B3) in FIG. 5 are matrices presenting Laplacian filters as second-order differentiation filters for two-dimensional images, which detect edge areas in contrasts in terms of the horizontal direction X1, π/3 direction X2, and 2π/3 direction X3, respectively.

Any of such differentiation filters may be used for contrast detection for the three directions X1 to X3 in the present embodiment as illustrated in FIG. 4A. In addition, the first-order differentiation filters presented by (A1) to (A3) in FIG. 5 are given as matrices each forwarding in a direction in each of the three directions X1 to X3, and therefore matrices each forwarding in the reverse direction in each of the three directions X1 to X3 may be used as presented by (C1) to (C3) in FIG. 5, in which elements are reversed.

The feature detecting unit 163D accumulates each contrast obtained for the three directions X1 to X3. This accumulated value is a value which presents a contrast amount for each direction within the specific area centered on the selected focus detecting area AFP. After that, the accumulated values for the three directions X1 to X3 are compared with one another to determine either one direction X1, X2 or X3 which provides the largest contrast. For example, if the contrast for X1 direction is largest, a predetermined number of data values are extracted along the X1 direction within the specific area centered on the selected focus detecting area AFP. Hereinafter, description will be continued assuming that the focus detecting direction is the X1 direction.

After determining the X1 direction as being the focus detecting direction, the feature detecting unit 163D calculates luminance differences, i.e. contrasts, among the photoelectric conversion elements 162a (elements constituting the two-dimensional image) of each micro lens 161a within the determined focus detecting direction X1. If the luminance value of two-dimensional image is given by V[i, j] ("i" presents the row number of photoelectric conversion element 162a for the X2 direction, and "j" presents the column number of photoelectric conversion element 162a for the X2 direction), then the contrast C[i, j] between adjacent photoelectric conversion elements 162a can be obtained from the following equation (1).

$$C[i,j]=|V[i,j]-V[i+1,j]| \quad (1)$$

Thereafter, the position of photoelectric conversion element 162a is extracted as a feature point, which corresponds to the center position of micro lens 161a where the calculated contrast C[i, j] is relatively large. Note that the feature extraction is not limited to only those by the above equation (1), and any method may be adopted as long as capable of detecting physical quantities relevant to the contrast.

Referring still again to FIG. 2, a region setting unit 163E selects, from feature points extracted by the feature detecting unit 163D, a feature point adjacent to the center of the focus detecting area AFP, and sets a focus detecting region centered on the selected feature point. If, as shown in FIG. 4A, the extracted feature point for the X1 direction corresponds to two micro lenses 161X, then a focus detecting region AFA is assigned centered around those, as shown by dashed dotted line.

It is to be noted that, even if the feature point exists at a position apart from the focus detecting area AFP, the focus detecting region AFA may be assigned centered on that feature point. Such assignment allows a part with high contrast to be set as the focus detecting region AFA regardless of the contrast within the selected focus detecting area AFP.

The image signal extracting unit 163F shown in FIG. 2 reads out from the memory 163B the output signals from the plurality of photoelectric conversion elements 162a corresponding to micro lenses 161a within the focus detecting region AFA set by the region setting unit 163E, and generates a pair of signal sequences for focus detecting, which presents an image shift amount caused from a pair of light fluxes having passed through different pupil areas of the shooting lenses 210.

At the time of generating the pair of signal sequences for focus detecting, the image signal extracting unit 163F initially determines a group of elements for focus detecting to obtain the pair of signal sequences for focus detecting, from the photoelectric conversion elements 162a constituting the photo-detector array 162, which corresponds to the micro lenses 161a within the focus detecting region AFA set by the region setting unit 163E. The group of elements for focus detecting is determined based on the aperture value of the lens barrel 200, luminance or brightness of a subject, and the focus detecting direction determined by the feature detecting unit 163D. Note that the aperture value of the lens barrel 200 is obtained from the lens controller 250. Also note that the luminance of a subject may be determined based on the outputs from the photo-detector array 162, which are read out from the memory 163B. Further the focus detecting direction is a direction having been determined by the feature detecting unit 163D and is supposed to be the X1 direction in the present embodiment.

Figure 7A:
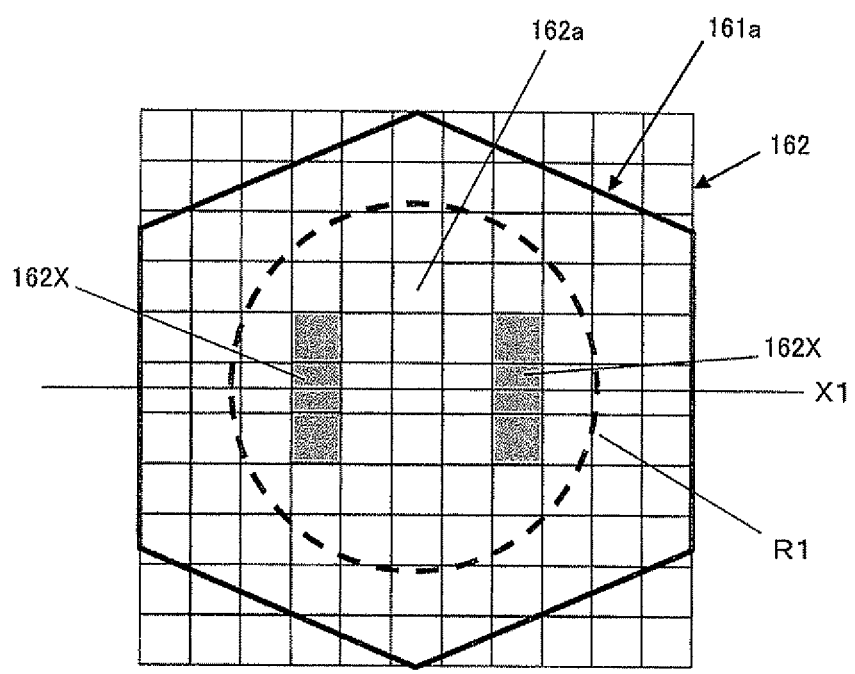
FIG. 7A is a view for explaining a determining method of the group of elements for focus detecting in the focus detecting apparatus of the camera illustrated in FIG. 1.

FIG. 7A is a view for explaining a determining method of the group of elements for focus detecting, and more specifically an enlarged plan view of one element of the focus detecting optical system 161 and the focus detecting sensor 162, wherein a group of elements for focus detecting 162X has exemplarily determined by the image signal extracting unit 163F. Hereinafter, a specific determining method for a group of elements for focus detecting will be described referring to the example shown in FIG. 7A.

The image signal extracting unit 163F initially determines, depending on the aperture value of the lens barrel 200, photoelectric conversion elements 162a which are detectable for light fluxes from a subject, among the photo-detector array 162. For example, as the example shown in FIG. 7A, when the aperture value of the lens barrel 200 is F4.0, the size of each photoelectric conversion element 162a is 5 μm, the diameter of each micro lens 161a is 60 μm, and the focal distance of each micro lens 161a is 150 μm, the photoelectric conversion elements 162a detectable for light fluxes from a subject are restricted to be within a circle having diameter of 37.5 μm centered on the photoelectric conversion element 162a which is located at the center, among the photo-detector array 162. Note that the circle R1 shown by dashed line in FIG. 7A is an area where the photoelectric conversion elements 162a detectable for light fluxes from a subject may exist.

Then, the image signal extracting unit 163F determines, based on the luminance of a subject, the number of photoelectric conversion elements 162a which constitute a pair of the groups of elements for focus detecting 162X. FIG. 7A illustrates an example in which the number of photoelectric conversion elements 162a constituting each group of elements for focus detecting 162X is set as being three based on the luminance of a substance. In addition, as shown in FIG. 7A, the pair of the groups of elements for focus detecting 162X are formed as being a symmetric pattern.

Thereafter, the image signal extracting unit 163F determines the pair of the groups of elements for focus detecting 162X, based on the area where the photoelectric conversion elements 162a detectable for light fluxes from a subject exist (i.e. the area within the circle R1 shown by dashed line in FIG. 7A), the number of photoelectric conversion elements 162a constituting the pair of the groups of elements for focus detecting 162X, and the focus detecting direction determined by the feature detecting unit 163D, from the photoelectric conversion elements 162a which are detectable for light fluxes from a subject (the photoelectric conversion elements 162a which exist within the circle R1 shown by dashed line in FIG. 7A). The pair of the groups of elements for focus detecting 162X is required to be selected to have a certain base line length and such that this base line length is substantially identical with the X1 direction as the focus detecting direction. It is preferred that the base line, which is the distance between the pair of the groups of elements for focus detecting 162X, is large as much as possible because of allowing high accuracy in focus detecting. For this reason, in the case of FIG. 7A, the pair of the group of elements for focus detecting 162X is to be selected as shown in the same figure.

Note that, at the time of determining the groups of elements for focus detecting 162X, the reason why the number of photoelectric conversion elements 162a constituting the groups of elements for focus detecting 162X is determined depending on the luminance of a subject is as follows. That is, if the number of the photoelectric conversion elements 162a constituting the groups of elements for focus detecting 162X is determined regardless of the luminance of a subject, then the accuracy in focus detecting varies depending on the luminance of a subject thereby to deteriorate the accuracy in focus detecting in case of low luminance of a subject, for example. To this end, in the present embodiment, if the luminance of a subject is low, then the number of the photoelectric conversion elements 162a constituting the groups of elements for focus detecting 162X is increased in order to gain a high sensitivity with expanded light receiving surface area, while if the luminance of a subject is high, then the number of the photoelectric conversion elements 162a constituting the groups of elements for focus detecting 162X is decreased.

Figure 7B:
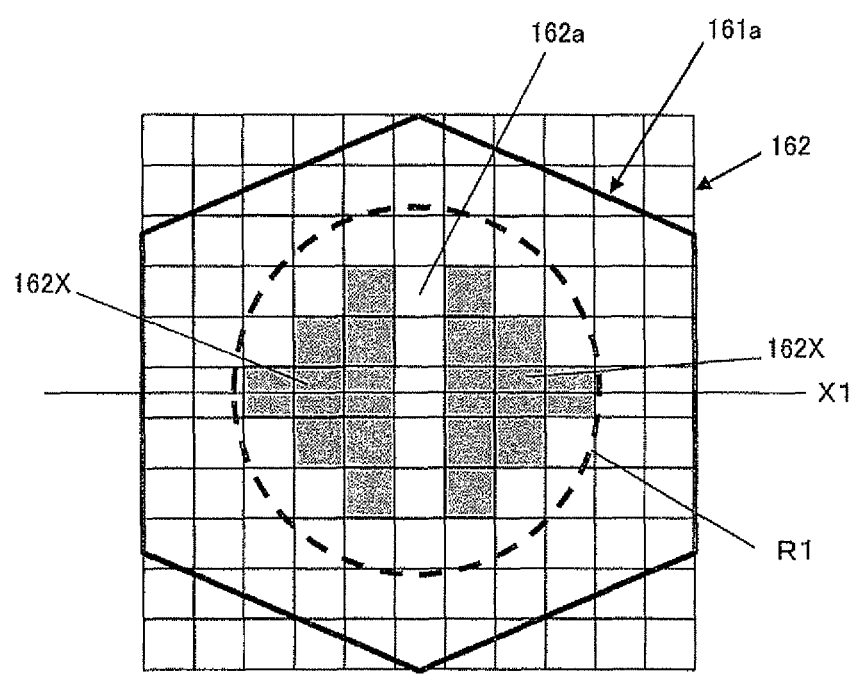
FIG. 7B is a view for explaining a determining method of the group of elements for focus detecting in the focus detecting apparatus of the camera illustrated in FIG. 1.
Figure 7C:
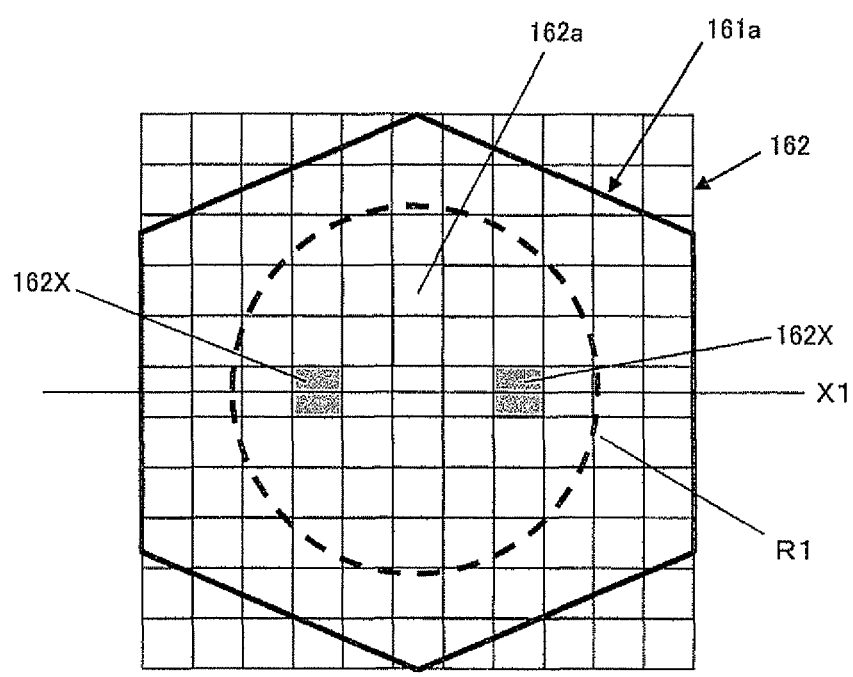
FIG. 7C is a view for explaining a determining method of the group of elements for focus detecting in the focus detecting apparatus of the camera illustrated in FIG. 1.

For example, when the luminance of a subject is low, the number of the photoelectric conversion elements 162a constituting each group of elements for focus detecting 162X may be set to nine, for example shown in FIG. 7B, to ensure a sensitivity three times higher than that of the example shown in FIG. 7A. In contrast, when the luminance of a subject is high, the number of the photoelectric conversion element 162a constituting each group of elements for focus detecting 162X may be set to one, for example shown in FIG. 7C, and in this case the sensitivity becomes to be one third of the example shown in FIG. 7A.

Figure 7D:
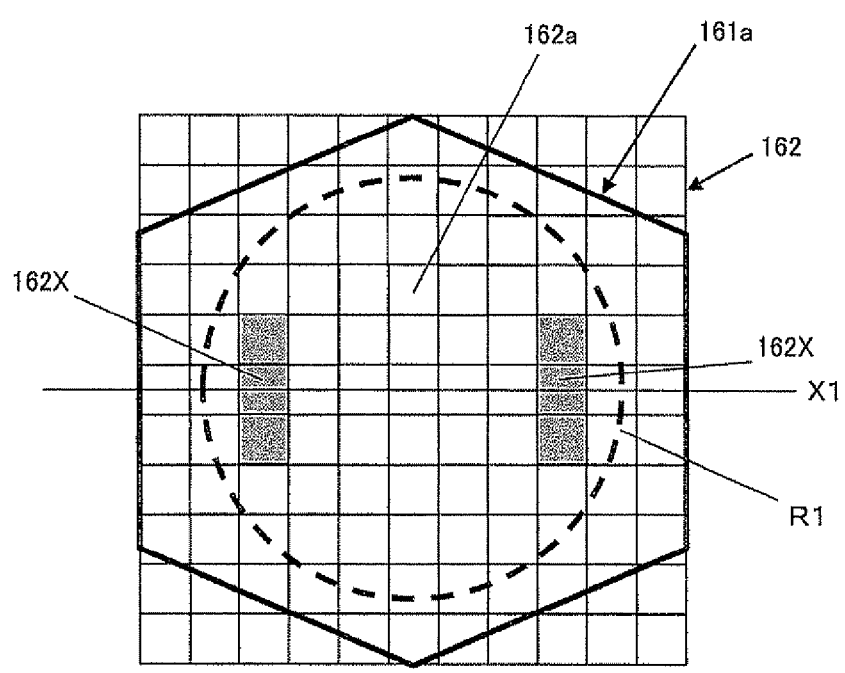
FIG. 7D is a view for explaining a determining method of the group of elements for focus detecting in the focus detecting apparatus of the camera illustrated in FIG. 1.

On the other hand, in the case where the same conditions as those for FIG. 7A are adopted except that the aperture value of the lens barrel 200 is F3.0, as shown in FIG. 7D, the area where the photoelectric conversion elements 162a detectable for light fluxes from a subject exist (the area within the circle R1 shown by dashed line in FIG. 7D) comes to be large compared with the case of FIG. 7A. As described above, it is preferred that the base line, which is the distance between the pair of the groups of elements for focus detecting 162X, is large as much as possible because of allowing high accuracy in focus detecting. Therefore, in the case of FIG. 7D, the pair of the group of elements for focus detecting 162X is to be selected as shown in the same figure.

Figure 7E:
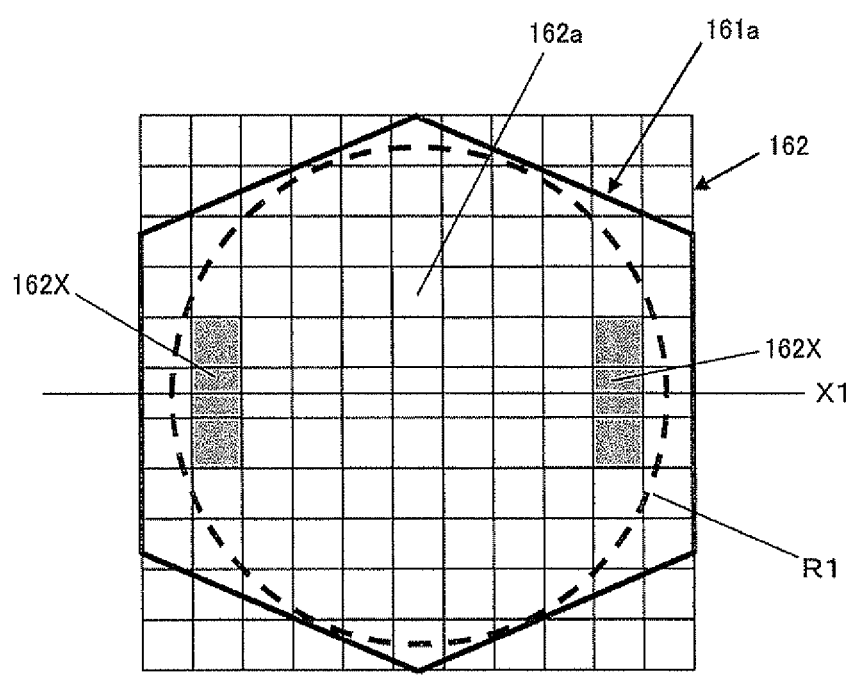
FIG. 7E is a view for explaining a determining method of the group of elements for focus detecting in the focus detecting apparatus of the camera illustrated in FIG. 1.

Similarly, FIG. 7E illustrates an example where the same conditions as those for FIG. 7A are adopted except that the aperture value of the lens barrel 200 is F2.8, and the area where the photoelectric conversion elements 162a detectable for light fluxes from a subject exist (the area within the circle R1 shown by dashed line in FIG. 7E) comes to be more large compared with the cases of FIG. 7A and FIG. 7D, as shown in FIG. 7E. Therefore, in the case of FIG. 7E, the pair of the groups of elements for focus detecting 162X is to be selected as shown in the same figure.

Figure 7F:
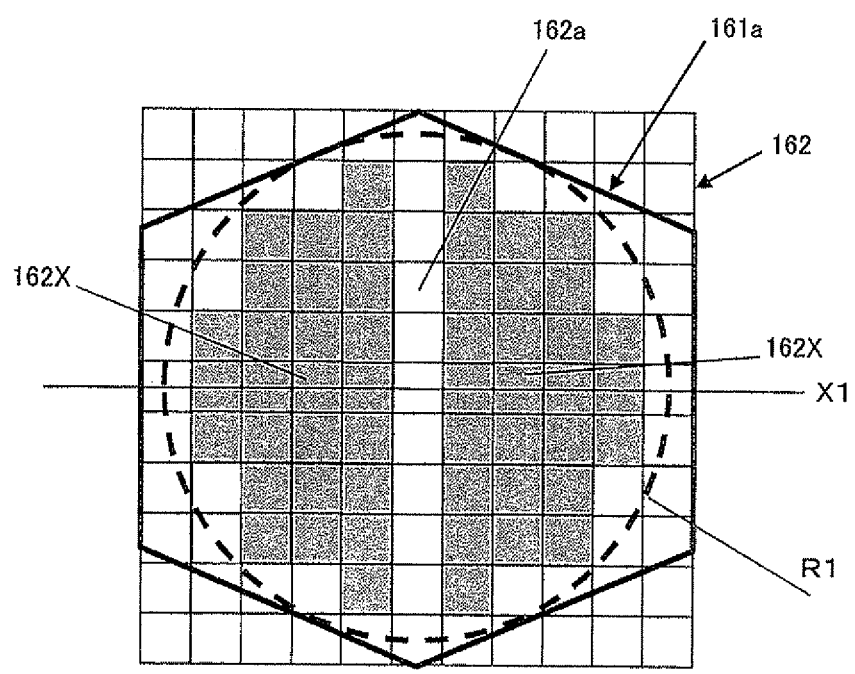
FIG. 7F is a view for explaining a determining method of the group of elements for focus detecting in the focus detecting apparatus of the camera illustrated in FIG. 1.

Moreover, in the case where the aperture value of the lens barrel 200 is F2.8 similarly with the case of FIG. 7E and the luminance of a subject is low, the number of the photoelectric conversion elements 162a constituting each group of elements for focus detecting 162X may be set to 27, for example shown in FIG. 7F, to ensure a sensitivity nine times higher than that of the case shown in FIG. 7E.

It is preferred that, at the time of determining the pair of the groups of elements for focus detecting 162X, a method is employed in which an arrangement pattern table for groups of elements for focus detecting is preliminarily prepared to have a relationship between each of the aperture values of the lens barrel 200 and the luminance values of a subject and each of the arrangement patterns of the photoelectric conversion elements 162a constituting the pair of the groups of elements for focus detecting 162X on the assumption that the focus detecting direction is the X1 direction, and the table is used. Using such arrangement pattern table, based on each information for the aperture value of the lens barrel 200 and the luminance of a subject and information for the focus detecting direction determined by the feature detecting unit 163D, the pair of the groups of elements for focus detecting 162X matching these information may be determined from the arrangement pattern table. Note that such arrangement pattern table may be stored in the camera controller 170.

Thereafter, the image signal extracting unit 163F generates a pair of signal sequences for focus detecting, i.e. a first signal sequence {aj} and a second signal sequence {bj} a is a natural number), from the output signals of the photoelectric conversion elements 162a constituting the pair of the groups of elements for focus detecting 162X, and outputs these signal sequences to an image shift amount calculation unit 163G. Here, the suffix j in the first signal sequence {aj} and the second signal sequence {bj} is a natural number depending on the number of the photoelectric conversion elements 162a constituting the pair of the groups of elements for focus detecting 162X.

Different from the examples shown in FIG. 7A to FIG. 7F on the other hand, there may be possibly a case where the feature detecting unit 163D sets the focus detecting direction as being a direction other than the X1 direction, i.e. the X2 direction or the X3 direction. In this case, for example when the focus detecting direction is set to be the X2 direction, the above-described arrangement pattern table may not be adopted without modification. For this reason, the arrangement pattern table is used after the coordinate rotation of 60° centering the center position of each micro lens 161a according to the following method.

More specifically, similarly with the above case of setting the focus detecting direction of the X1 direction, an arrangement pattern table is prepared based on information including the aperture values of the lens barrel 200, the focus detecting direction determined by the feature detecting unit 163D, and luminance values of a subject. Then, the prepared arrangement pattern table is subjected to coordinate rotation of 60° centered on the center position of each micro lens 161a.

Note that, after the coordinate rotation of 60° for the arrangement pattern table, if the optical axis center position of each micro lens 161 is expressed as pm(xm, ym), the relative position of each photoelectric conversion element 162a to the center of the pair of the groups of elements for focus detecting 162X is expressed as P(p, q), then the relative position P(Xr, Yr) of each photoelectric conversion elements 162a after the coordinate rotation of 60° may be expressed by the following equation (2), where xm and ym are numerical values having values after the decimal points, and n and u are integers.

$$\begin{pmatrix} Xr \\ Yr \end{pmatrix} = \begin{pmatrix} \cos\pi/3 & -\sin\pi/3 \\ \sin\pi/3 & \cos\pi/3 \end{pmatrix} \begin{pmatrix} p \\ q \end{pmatrix} + \begin{pmatrix} xm \\ ym \end{pmatrix} \quad (2)$$

Here, since Pr(Xr, Yr) calculated by the above equation (2) is a numerical value having a value after the decimal point, respective fractional portions s and t of Xr and Yr are obtained by s=Xr−[Xr] and t=Yr−[Yr], respectively, where [Xr] and [Yr] are respective integer portions of Xr and Yr.

Then, supposing that the signal output of the photoelectric conversion element 162a corresponding to ([Xr], [Yr]) is given by O(xr, yr), the output Od of the photoelectric conversion element 162a corresponding to ([Xr], [Yr]) may be obtained by the following equations (3) to (5).

$$Od1 = (1-s) \cdot O(xr, yr) + s \cdot O(xr+1, yr) \quad (3)$$

$$Od2 = (1-s) \cdot O(xr, yr) + s \cdot O(xr+yr) \quad (4)$$

$$Od = (1-t) \cdot Od1 + t \cdot Od2 \quad (5)$$

Thereafter, by obtaining the output Od for each photoelectric conversion element 162a and calculating the value given by the following equation (6) using the above results, a pair of signal sequences for focus detecting i.e. the first signal sequence {aj} and the second signal sequence {bj}, which are based on the pair of the groups of elements for focus detecting 162X after the coordinate rotation of 60°, may be obtained.

$$\sum_{p,q} Od \quad (6)$$

Note that, also in the case where the focus detecting direction is set for the X3 direction, the first signal sequence {aj} and the second signal sequence {bj} may be obtained similarly with the above.

Returning to FIG. 2, the image shift amount calculation unit 163G executes an image shift calculation using the first signal sequence {aj} and the second signal sequence {bj}, thereby to calculate a defocus amount. In this calculation, a correlation calculation value Dk with respect to a pair of images (signal sequences) is initially calculated from the following equation (7) utilizing the first signal sequence {aj} and the second signal sequence {bj}.

$$D_k = \sum_i |a_{i+k} - b_i| \quad (7)$$

Figure 8:
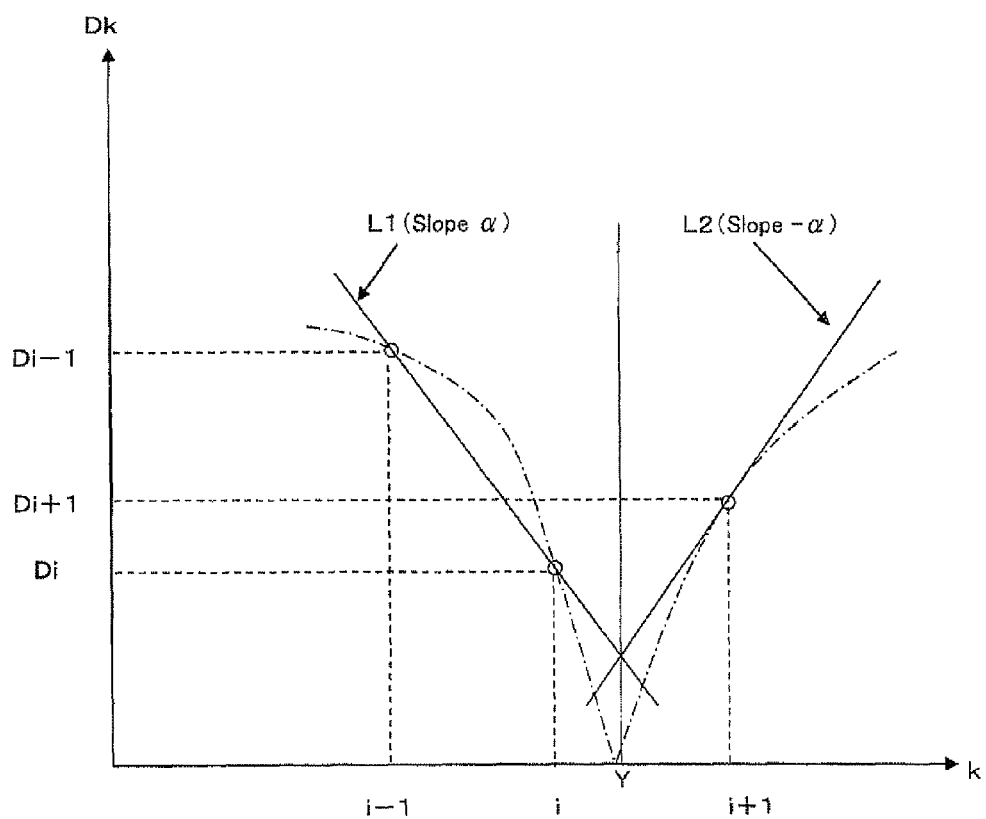
FIG. 8 is a graph for describing a method for calculating a shift amount D in the focus detecting apparatus of the camera illustrated in FIG. 1.

As shown in FIG. 8, let the minimum Dk be Di, and Dks adjacent thereto be Di+1 and Di−1. Greater one is selected from Di+1 and Di−1. In this example illustrated in the same figure, Di−1 greater than Di+1 is selected. Thereafter, the selected Di−1 and Di are connected by a straight line L1 having a slope α. Then, a straight line L2 having a slope −α and passing through Di+1 is assumed, and the intersection point of straight lines L1 and L2 is obtained. Thus, value Y of the intersection point corresponds to a relative shift amount of received light signal.

In order to convert the relative shift amount Y to an actual shift amount D (distance to the focal point), the calculation may be performed using the following equation (8) and a factor K depending on the base line length of the photoelectric conversion elements 162a constituting the pair of the groups of elements for focus detecting 162X.

$$D = K \cdot Y \quad (8)$$

Note that the factor K depending on the base line length may be obtained by calculating a sum of moments from respective optical axis centers in terms of the photoelectric conversion elements 162a constituting the pair of the groups of elements for focus detecting 162X.

Return again to FIG. 2, the lens driving amount calculation unit 164 receives the actual shift amount D transmitted from the focus detecting calculation unit 163, and calculates a lens driving amount Δd for causing the actual shift amount D to be zero, thereafter outputting the calculated result to the lens driving controller 165.

The lens driving controller 165 transmits a driving command to the lens driving motor 230 while receiving the lens driving amount Δd transmitted from the lens driving amount calculation unit 164, and drives the focus lens 211 in response to the lens driving amount Δd.

As described above, in the camera 1 according to the present embodiment, the pair of the groups of elements for focus detecting 162X is determined based on the aperture value of the lens barrel 200 and the luminance of a subject, and the focus detecting is performed based thereon. Therefore, a remarkable accuracy in focus detecting can be achieved.

It is to be noted that the embodiments as explained above are described to facilitate understanding of the present invention and are not described to limit the present invention. Therefore, it is intended that the elements disclosed in the above embodiments include all design changes and equivalents to fall within the technical scope of the present invention.

Although the above embodiments involve hexagonal micro lenses 161a arranged in a honeycomb structure, circular micro lenses arranged squarely may also be used.

Moreover, the focus detecting sensor 162 is provided as a two-dimensional sensor separate from the image sensor 110 in the present embodiments. Alternatively, micro lenses 161a and photoelectric conversion elements 162a may be provided as a portion of the image sensor 110 in a similar manner, thereby to enable focus detecting through the procedure described above.

What is claim is:
1. A focus detecting apparatus comprising:
a micro lens array arranged with a plurality of micro lenses;

a photo detector that has a plurality of detecting elements provided in correspondence with the micro lenses and receives light flux from an optical system via the micro lenses; and a focus detector that selects a pair of groups of detecting elements from the plurality of detecting elements based on an F-value of the optical system and a brightness of the light flux from the optical system, and detects a focus adjustment status of the optical system based on a pair of light receiving signals obtained in the groups of detecting elements, wherein at a time of selecting the pair of groups of detecting elements from the plurality of detecting elements, the focus detector selects the pair of groups of detecting elements based on a table having a relationship between an F-value of the optical system and a brightness of the light flux from the optical system and arrangement patterns of the detecting elements, constituting the pair of group of detecting elements.

2. The focus detecting apparatus as recited in claim 1, wherein the focus detector determines a distance between the pair of groups of detecting elements depending on the F-value.

3. The focus detecting apparatus as recited in claim 1, wherein the focus detector decreases, when the brightness of the light flux is higher, a number of the detecting elements included in the group of detecting elements compared with when the brightness of the light flux is lower.

4. The focus detecting apparatus as recited in claim 1, wherein the focus detector sets a selecting number of the detecting elements in response to outputs of the detecting elements.

5. The focus detecting apparatus as recited in claim 1, wherein the focus detector selects, as the groups of detecting elements, a plurality of detecting elements symmetrical about a position corresponding to a pupil center of the optical system, from the plurality of detecting elements.

6. The focus detecting apparatus as recited in claim 1, wherein the focus detector converts a relative shift amount in the pair of light receiving signals having been selected to a defocus amount of the optical system, and determines a conversion factor at a time of the converting depending on a distance between the pair of groups of detecting elements.

7. An imaging apparatus comprising a focus detecting apparatus, the focus detecting apparatus comprising a focus detecting apparatus as recited in claim 1.

\* \* \* \* \*